Dec. 13, 1927.
A. E. BRONSON
NUT
Filed June 4, 1923
1,652,235
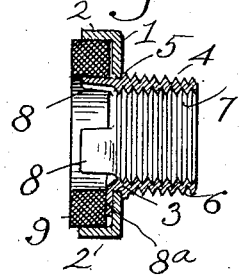
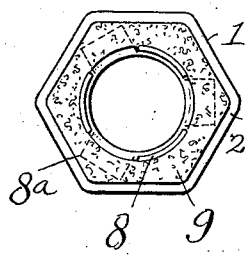
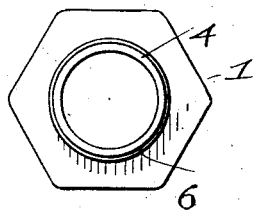
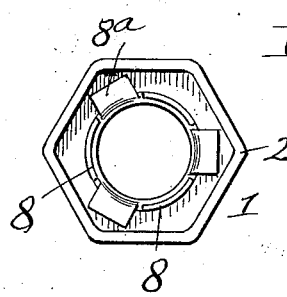
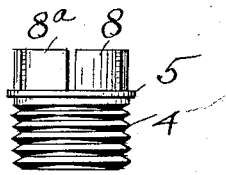
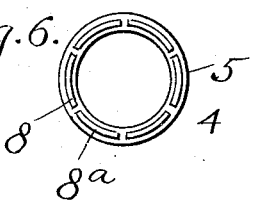
Inventor
Adelbert E. Bronson
By Thurston Kwis & Hudson
her Attorneys Patented Dec. 13, 1927.

1,652,235

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

NUT.

Application filed June 4, 1923. Serial No. 643,217.

The present invention relates to a nut structure which is particularly designed for use as a rim nut in connection with valve stems for pneumatic tires.

The object of the invention is to provide a nut structure which may be formed substantially entirely of sheet metal.

A further object is to provide a nut structure in which the nut is formed of two parts that are assembled with respect to each other, and at the same time provide means for retaining a packing member.

Reference should be had to the accompanying drawings forming a part of this specification, of which Fig. 1 is a sectional elevation of a rim nut embodying the invention; Fig. 2 is an end elevation of the showing in Fig. 1; Fig. 3 is an end elevation opposite to that shown in Fig. 2; Fig. 4 is an end elevation with the packing washer removed; Fig. 5 is an elevation of one portion of the nut structure before assembly; Fig. 6 is a bottom plan view of the showing in Fig. 5.

Referring to the drawings, 1 indicates a cup-shaped member which has a side flange 2 which is preferably of polygon form, and has an opening through the end thereof, which is indicated at 3.

Co-operating with the cup-shaped member is a cylindrical member 4 which is preferably formed with a shouldered portion 5 intermediate the ends thereof, and the outside surface of the cylindrical member above the shoulder is provided with screw threads, as indicated at 6. The interior wall of the cylindrical member is also provided with threads, as indicated at 7.

The cylindrical member beyond the portion which has the shoulder 5 is provided with a plurality of extensions which are indicated at 8, 8ª. Before the cylindrical member 4 is assembled with respect to the cup-shaped member 1, the extensions 8, 8ª are straight, practically forming continuations of the cylindrical member 4. In assembling the parts which have been described, the extensions 8 are inserted through the openings 3 and the top of the cup-shaped member 1 is brought into contact with the shoulder 5. The extensions 8ª are then bent or folded so as to come in contact with the under side of the top portion of the cup-shaped member 1, so that the cylindrical member 4 is in effect joined to and attached to the cup-shaped member 1, thereby forming a unitary structure.

The extensions 8ª are so positioned that when they are folded as described the corners of each projection will lie substantially in contact with adjacent side walls of the cup-shaped member 1 which is preferably formed as a polygon. This engagement between the extensions 8ª and the side walls of the member 1 will prevent relative rotation between the cylindrical member 4 and the cup-shaped member 1.

The extensions 8 are intermediate with respect to the extensions 8ª and these are permitted to remain in their straight condition so that they extend into the cup-shaped member 1. A ring-like packing washer 9 is then assembled within the cup-shaped member 1, and it is of such size that it will pass inside of the extensions 8. When the washer 9 is assembled the extensions 8 may be bent outwardly slightly so as to bear against the inner portion of the packing washer 9, thus retaining it within the cup-shaped member 1 and preventing accidental dropping out of the same.

In the use of the nut, particularly in connection with a valve stem, the interior threads 7 are adapted to engage with the exterior threaded surface of the valve stem, while the exterior threads upon the cylindrical member 4 are adapted to engage with a dust cap of standard construction, or in fact, of any desired construction.

Having described my invention, I claim:—

1. The combination, with a cup-shaped member having an outer flange and a central opening in the bottom thereof, of a cylindrical member having a shoulder adapted to engage the outer surface of the cup-shaped member adjacent the opening, said cylindrical member having a plurality of extensions extending beyond said shoulder which are adapted to extend through the opening, some of said extensions being bent into engagement with the inside surface of the cup-shaped member, thereby uniting the cup-shaped member and the cylindrical member, while the remaining extensions form with the flange of said cup-shaped member a packing retaining means.

2. A nut structure comprising a cup-shaped member having a central opening, a cylindrical member having a shoulder formed thereon which is adapted to engage with a surface of the cup-shaped member adjacent the opening, said cylindrical member being provided with a plurality of extensions which extend beyond the shoulder portion, certain of said projections being bent into engagement with the inside of the cup thereby holding the cup-shaped member and the cylindrical member together, and a packing member inside of the cup-shaped portion and also engaged by certain of said extensions.

3. A nut structure comprising a cup-shaped member having a central opening and a depending outer flange, a cylindrical member having a shoulder which is adapted to engage with a portion of the cup-shaped member said cylindrical member having a plurality of extensions which extend through the said opening in the cup-shaped member certain of said extensions being bent into engagement with the inside of the cup-shaped member thereby joining the cup-shaped member and the cylindrical member, others of said extensions remaining substantially straight, a ring-like washer member inserted within the cup-shaped member the inner surface of said washer also engaging with certain of the extensions.

4. A nut structure comprising a cup-shaped member having a central opening and a depending skirt of polygon shape, a hollow cylindrical member having a shoulder on the outer surface thereof which is adapted to engage the said cup-shaped member adjacent the opening therein said cylindrical member having threads upon the inner surface and upon the outer surface thereof, said cylindrical member having a plurality of extensions which pass through the openings in the said cup-shaped member, certain of said extensions being bent into engagement with the inner surface of the cup-shaped member, a ring like washer member inserted within the cup-shaped member, the inner surface of said ring shaped member being engaged by certain of the said extensions.

In testimony whereof, I hereunto affix my signature.

ADELBERT E. BRONSON.